W. DAHLMANN.
METHOD OF MANUFACTURING BALL BEARINGS AND THE LIKE.
APPLICATION FILED DEC. 6, 1906.
958,477.
Patented May 17, 1910.
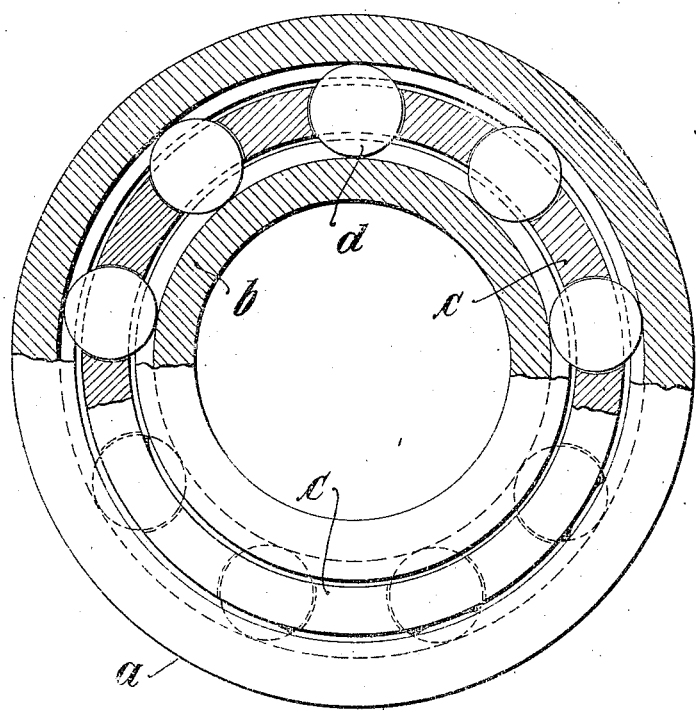
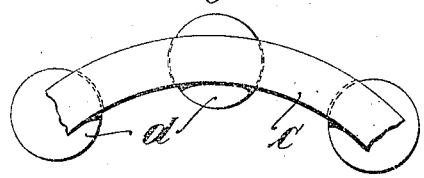
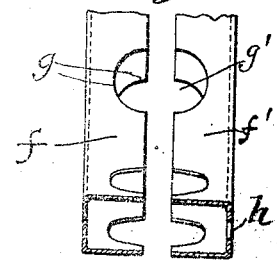
WITNESSES
INVENTOR:
Wilhelm Dahlmann,
By his Attorneys

UNITED STATES PATENT OFFICE.

WILHELM DAHLMANN, OF BERLIN, GERMANY.

METHOD OF MANUFACTURING BALL-BEARINGS AND THE LIKE.

958,477.  Specification of Letters Patent.  Patented May 17, 1910.

Application filed December 6, 1906. Serial No. 346,671.

*To all whom it may concern:*

Be it known that I, WILHELM DAHLMANN, a subject of the German Emperor, residing at 43/44 Dorotheenstrasse, Berlin, in the Empire of Germany, engineer, have invented certain new and useful Improvements in Methods of Manufacturing Ball-Bearings and the Like, of which the following is a specification.

This invention relates to an improved cage for ball bearings and a method of manufacturing the same.

Cages for ball bearings, as commonly constructed, usually comprise a series of specially-shaped separately constructed parts which are manufactured by suitable turning or milling operations. Such cages are relatively expensive to manufacture not only because of the number of parts usually employed, but because the latter must be very precisely made and nicely adjusted. If these considerations are not observed friction is engendered which not only interferes with the proper working of the bearing, but frequently causes a breaking of the cage or balls.

It has been proposed to mount the balls in a suitable mold and to cast a cage about them, the cage being of such proportion that it extends closely about the balls, and forms an inseparable connection therewith. This method of manufacture, however, is not adapted for use in connection with bearings having ball rings or races provided with grooves or channels, since it is impossible to insert the cage with the balls mounted therein in the bearing.

According to my invention I provide a bearing having channels or grooves in combination with a ball cage formed of metal pressed or cast around the balls. In practicing my invention I first insert the balls in the bearing between the inner and outer rings. This may be easily done by holding the inner ring eccentrically to the outer ring and passing the balls between the two at the point of greatest separation. When the requisite number of balls are introduced, the rings are concentrically arranged and the balls spaced at proper distances apart within the bearing. I then cast or press a ring, preferably of solid metal, around the balls.

In the accompanying drawings illustrating my invention: Figure 1 is an elevation partly in section of a ball bearing having a cage constructed according to the present invention. Fig. 2 is a cross section of Fig. 1. Fig. 3 illustrates a part of the cage removed. Fig. 4 illustrates a part of a mold which may be used in connection with my invention.

In the drawings $a$ indicates the outer ring or race of the bearing and $b$ the inner ring. Preferably both of these parts are formed with channels or grooves in which the balls $d$ run, as best seen in Fig. 2. The balls $d$ are spaced apart at proper intervals by the cage $c$ which, as shown, comprises a ring of solid metal having at intervals circular recesses in which the balls are confined.

In practicing my invention after the balls are introduced between the rings $a$ and $b$, they are held in proper position by any suitable means, and the cage $c$ is pressed or cast about them. Preferably I make use of a mold such as is shown in Fig. 4 which consists of two annular hollow sections $f\ f'$, the interior of each of which is shaped in accordance with the desired contour for the completed cage. Each of the sections $f\ f'$ is formed in its upper and lower walls with a series of semi-circular recesses $g\ g'$. In casting the cage the balls are first introduced into the rings. One of the sections $f\ f'$ is then inserted through the ring from one side, the balls being spaced apart so that each fits in the recesses $g$ or $g'$. The opposite section is then inserted so that its recesses correspond to those of the first section and so that its inner edge meets the inner edge of the first section. In this condition the sections $f\ f'$ constitute molds which accurately fit the series of balls so that no metal can escape outwardly between the inner edges of the sections, or around the balls. The bearing is then placed in a horizontal position, and the metal is poured into the mold through a suitable opening or openings in one of the sections. The hot metal flows around the entire mold and encircles the balls, forming the cage substantially as shown in Fig. 3. A pouring hole is shown at $h$ in Fig. 4, although any suitable aperture may be made in the mold for introducing the metal. The metal does not weld to the balls and is not cooled by the latter to such an extent as to prevent it from flowing. When the metal cools if it is found that the cage hugs the balls too tightly, a few turns of the bearing or a moving of the individual balls is all that is necessary to place the bearing in running condition. Preferably a rather soft metal is used for the cage.

The cage when completed preferably forms a homogeneous undivided ring which fills up the intermediate spaces existing between the balls. It may be finished on its outer surface in any suitable way, although this will ordinarily be unnecessary.

While I have described my invention with relation to a ball bearing it is obvious that it may be applied to roller bearings or the like.

What I claim as my invention and desire to secure by Letters Patent is:—

1. The method of manufacturing ball bearings which consists in constructing a substantially solid cage about the balls while the latter are mounted in position between the inner and outer elements of the bearing.

2. The method of manufacturing ball bearings which consists in forming inner and outer channeled rings, mounting the balls between such rings, spacing the balls apart, and constructing a substantially solid cage around the balls while in such positions.

3. The method of manufacturing ball bearings which consists in forming inner and outer channeled rings, mounting the balls between such rings, spacing the balls apart, and casting a cage around the balls while in such positions.

4. The method of manufacturing ball bearings which consists in forming inner and outer channeled rings, mounting the balls between such rings, spacing the balls apart by a mold and casting a cage in said mold.

In witness whereof, I have hereunto signed my name in the presence of two subscribing witnesses.

WILHELM DAHLMANN.

Witnesses:
 HENRY HASPER,
 WOLDEMAR HAUPT.